United States Patent [19]
Dockser

[11] Patent Number: 5,862,370
[45] Date of Patent: Jan. 19, 1999

[54] DATA PROCESSOR SYSTEM WITH INSTRUCTION SUBSTITUTION FILTER FOR DEIMPLEMENTING INSTRUCTIONS

[75] Inventor: Kenneth A Dockser, San Jose, Calif.

[73] Assignee: VLSI Technology, Inc., San Jose, Calif.

[21] Appl. No.: 534,422

[22] Filed: Sep. 27, 1995

[51] Int. Cl.$^6$ ........................................................ G06F 9/30
[52] U.S. Cl. ........................................ 395/567; 395/568
[58] Field of Search .................................... 395/567, 568, 395/800

[56] References Cited

U.S. PATENT DOCUMENTS

| | | | |
|---|---|---|---|
| 4,109,311 | 8/1978 | Blum et al. | 395/567 |
| 4,298,933 | 11/1981 | Shimokawa et al. | 395/567 |
| 4,425,618 | 1/1984 | Bishop et al. | 395/567 |
| 5,226,122 | 7/1993 | Thayer | 395/275 |
| 5,226,127 | 7/1993 | Fu et al. | 395/567 |
| 5,274,815 | 12/1993 | Trissel et al. | 395/567 |
| 5,367,661 | 11/1994 | Hogh et al. | 395/500 |
| 5,381,530 | 1/1995 | Thayer | 395/275 |
| 5,455,936 | 10/1995 | Maemura | 395/183.11 |
| 5,479,620 | 12/1995 | Kiyohara et al. | 395/567 |

OTHER PUBLICATIONS

VY86C060 Architectural Overview, VLSI Technology, San Jose, Jan. 1994, pp. 6–10.

"ARM FPA10 Data Sheet", ARM, Limited, Cambridge, England., 1993, pp. 16–17.

Flynn, Laurie, "Intel Facing a General Fear of Its Pentium Chip", *New York Times,* Dec. 19, 1994 (copy downloaded from America Online, Inc.) no page numbers.

ARM70DM *Data Sheet:* Chapter 9: Debug Support Hardware, ARM Limited, Cambridge, England, Jul. 1993, pp. 105–109.

Gwennap, Linley, "Intel Releases Pentium Errata List" *Microprocessor Report,* Mar. 6, 1995, pp. 15–19.

*Primary Examiner*—William M. Treat
*Assistant Examiner*—Zarni Maung
*Attorney, Agent, or Firm*—Clifton L. Anderson

[57] ABSTRACT

A data processing system includes a microprocessor, memory, and an instruction substitution filter. The microprocessor has separate data and instruction caches. The filter includes configuration memory that occupies memory mapped I/O space. Configuration data indicating instruction types to be deimplemented is entered into the filter during a boot sequence. Once configured, the filter substitutes call instructions for the deimplemented instructions. When executed, the call instructions activate a substitution routine that determines the address of the deimplemented instruction and then performs a data read of the unfiltered deimplemented instructions and then implements the function that the deimplemented function was intended to implement (but, due to microprocessor defects, does not). Accordingly, the present invention allows a microprocessor with defectively implemented instructions to be used as intended with minimal performance penalties.

10 Claims, 3 Drawing Sheets

DATA PROCESSOR SYSTEM WITH INSTRUCTION SUBSTITUTION FILTER FOR DEIMPLEMENTING INSTRUCTIONS

BACKGROUND OF THE INVENTION

The present invention relates to microprocessor systems and, more particularly, to a system and method for preventing execution of selected implemented instructions on a microprocessor. A major objective of the present invention is to provide for effective utilization of a defectively designed microprocessor.

More of modern progress is associated with advances in computer performance. Recent computers typically use one or more microprocessors to execute desired operations. Each microprocessor design is characterized by the set of "implemented" instructions it can recognize and execute. The instructions have a respective instruction format.

In many cases, the format can provide for "unimplemented" instructions that the microprocessor is not designed to execute. These unimplemented instructions are of two types: 1) defined but omitted; and 2) undefined (or "reserved"). Many processors are members of processor families that can include more and less sophisticated versions; some instructions that are implemented (and thus defined) on the more sophisticated versions are omitted on the less sophisticated versions. For example, floating-point instructions are defined but omitted on versions of microprocessors with nonfunctional or omitted floating-point units (Intel 486SX, Motorola 68LC040). "Undefined" instructions are not defined for any processor, but remain "reserved" for processors yet to be designed.

Microprocessors typically include some means for handling unimplemented instructions. For example, upon detection of an unimplemented instruction in a running application program, a microprocessor can access a software exception handler. The handler can retrieve the unimplemented instruction from memory and determine a suitable course of action. (For example, a floating-point operation can be executed in software if the microprocessor does not have a floating-point unit.) The exception handler can also store as much of the microprocessor's state as necessary for proper restoration before the interrupted application program resumes.

Because they are so widely used in critical as well as non-critical applications, microprocessor designs are extensively tested. However, as integrated circuit density has grown exponentially, so has the number of implemented logic functions. Design testing, using both simulation and prototypes, has also developed to permit more sophisticated confirmation of logic designs. However, the ability to implement functions in an integrated circuit is expanding faster than the ability to test the designs. Accordingly, it has become inevitable that a popular microprocessor would appear with a significant logic design error.

The inevitable became the actual in 1994 when a user identified a design defect in the Pentium processor from Intel Corporation. In some cases, a floating-point divide instruction yielded an erroneous result. As more complex processors are designed, such logic design defects can be expected to recur. Given that they are inevitable, the challenge becomes how to handle them once they are discovered.

Intel tried several approaches to addressing the Pentium defect. The first approach was to keep the defect secret while they worked on a redesign. While economical from a manufacturer's standpoint, this approach has proved unpopular with users that had to discard months of work due to uncertainties that arose once the defect was disclosed. The second approach was to offer a limited exchange only for those users who could demonstrate that the defect would affect them. This limited exchange approach was also unpopular because it placed a burden of proof on users, and threatened to leave other good faith purchasers to rely on a processor known to be defective.

A more popular approach was an open exchange of a defective processor with a corrected version of the processor. However, this is potentially a very costly solution as two processors are shipped for the price of one. The economics of the exchange can be much worse where the updated processor turns out to have subsequently discovered defects that require a further exchange.

There are also software-based solutions. For example, a software monitor program can examine an instruction stream in real time to detect for problematic instructions. This software approach is problematic because the instructions of the monitor must be executed for each program instruction, exacting a substantial performance penalty even for programs that do not use the problematic instructions. In addition, there is a significant potential for incompatibility with available software.

The performance penalty could be eliminated largely by recompiling programs to eliminate the offending instruction. The recompiling could be done "off-line". Intel provided such a solution involving multiplying dividends and divisors by $15/16$. The software manufacturers would have to recompile commercial programs, but then there is the cost and difficulty of reaching the consumers with the recompiled program. Moreover, a performance penalty would be suffered (relative to the unrecompiled program) when the processor was upgraded or the program transferred to another computer system with a different but related processor.

U.S. patent application Ser. No. 08/390,195 discloses a microprocessor with an instruction trap that can be configured to deimplement instructions. The built-in hardware trap imposes minimal performance penalties. However, this approach requires that the microprocessor be designed with provisions for instruction deimplementation. The trap approach is not well suited as a "retrofit", especially where the microprocessor has a built in cache or a closely coupled external cache.

What is needed is a better approach to dealing with logic design defects in installed microprocessors that do not provide for instruction deimplementation internally. This approach should preserve user expectations for the processor as well as the financial expectations of the manufacturer and distributors. Recompiling should not be required; performance penalties and software incompatibility should be minimized.

SUMMARY OF THE INVENTION

In accordance with the present invention, an instruction deimplementation subsystem for a data processing system comprises a configurable instruction filter for replacing an instruction to be deimplemented with a substitute instruction, e.g., a call instruction. The filter is located along the bus that carries instructions from a memory to a data processor. The filter passes non-deimplemented instructions unchanged, but replaces each deimplemented instruction with a substitute instruction. The substitute instruction can be used to call a substitution routine that correctly implements the intended function of the deimplemented instruction.

The filter includes an instruction input coupled to the memory for receiving instructions, including deimplemented instructions, from memory. The filter includes an instruction output coupled to the data processor for transmitting filtered instructions, including substitute instructions to the processor. The filter includes a configuration input for receiving configuration data. Preferably, the filter is treated by the processor as being in memory-mapped input-output (I/O) space so that the configuration input includes both an address input and a data port. The configuration data port can be bi-directional so that the filter configuration can be read by the processor. In the preferred embodiment, the configuration data port also serves as the instruction output.

At a minimum, the configuration data specifies the instructions to be deimplemented. The configuration data can also specify the instructions to be substituted; alternatively, the substitute instructions can be predetermined. Preferably, the configuration data specifies instruction types rather than individual instructions. One way to do this is to specify only some of the bits of an instruction, treating the remaining bits as wild cards for matching purposes.

Correspondingly, the substitute instruction can provide for unspecified bits to be filled in as a function of a received deimplemented instruction. For example, some instruction sets provide for conditionally executed instructions. Certain bits of the instructions are reserved for specifying the conditions under which an instruction is to be executed. These bits can be treated as wildcards for matching purposes. However, the values of these bits can be transferred to the substitute call instruction so that it shares the conditions of execution of the original instruction.

In limited cases, there can be a one-to-one correspondence between deimplemented instructions and call instructions so that a separate reading of the deimplemented instruction is not required. More generally, a substitution routine must determine the deimplemented instruction to carry out its intended function.

A subroutine can determine the deimplemented instruction by identifying its address and then accessing the contents of that address in memory. Where the substitute instruction is a call or similar instruction, the address of the deimplemented instruction is saved by the processor. The subroutine can simply read the appropriate register of the processor to determine the address. In some cases, for example, where the address of the call instruction is incremented by one and the incremented address is saved, the address of the deimplemented instruction can be computed from an address stored by the microprocessor.

One challenge of the present invention is for the subroutine to force a reading of the deimplemented instruction rather than of a cached substitute instruction. A data read instruction can be used in cacheless systems and in systems in which instructions and data are not combined in a cache (e.g., there are separate data and instruction caches). However, unless precautions are taken, a data read of a combined cache accesses the substitute instruction rather than the deimplemented instruction.

In the case of a combined data-plus-instruction cache, the filter can filter addresses as well as contents. A substitution routine can write the address of the deimplemented instruction (saved when the substituted call instruction is executed) to uncacheable memory I/O space in the filter. The substitution routine can then issue a data read from a reserved address in this space. The filter treats a data read from this reserved address as an instruction to transmit the address of the deimplemented instruction on the address but to main memory. This causes the memory to place the deimplemented instruction on the content but as data. The filter passes this data to the microprocessor unchanged. The substitution routine can then inspect the fully specified deimplemented instruction to determine an appropriate method of implementing the function the deimplemented instruction was designed to implement.

Once the exact deimplemented instruction is determined, the substitution routine may decide that the deimplemented instruction is non-problematic and reissue it. To prevent the reissued instruction from being filtered, the substitution routine can first issue an instruction that deactivates the filter until the substitution routine has run its course. If the deimplemented instruction cannot be reissued, the substitution routine implements in another way the function that was intended to be implemented by the deimplemented instruction. Once that function is implemented, the substitution routine can end, and the program (that includes the deimplemented instruction) can be resumed.

The present invention allows for correction of a defective processor, even where the defects are discovered after its installation in a system. The correction takes a minimal toll on processor performance. Preferably, the inventive filter is built into the same integrated circuit as the processor. However, a major advantage of the invention is that it functions effectively even where caches are interposed between the filter and the instruction decoder of the processor. This makes the invention suitable for correcting processors with built-in (level 1) caches and with external (level 2) caches that are tightly coupled to the processor. These and other features and advantages are apparent from the description below with reference to the following drawings.

DESCRIPTION OF THE PREFERRED EMBODIMENTS

Figure 1:
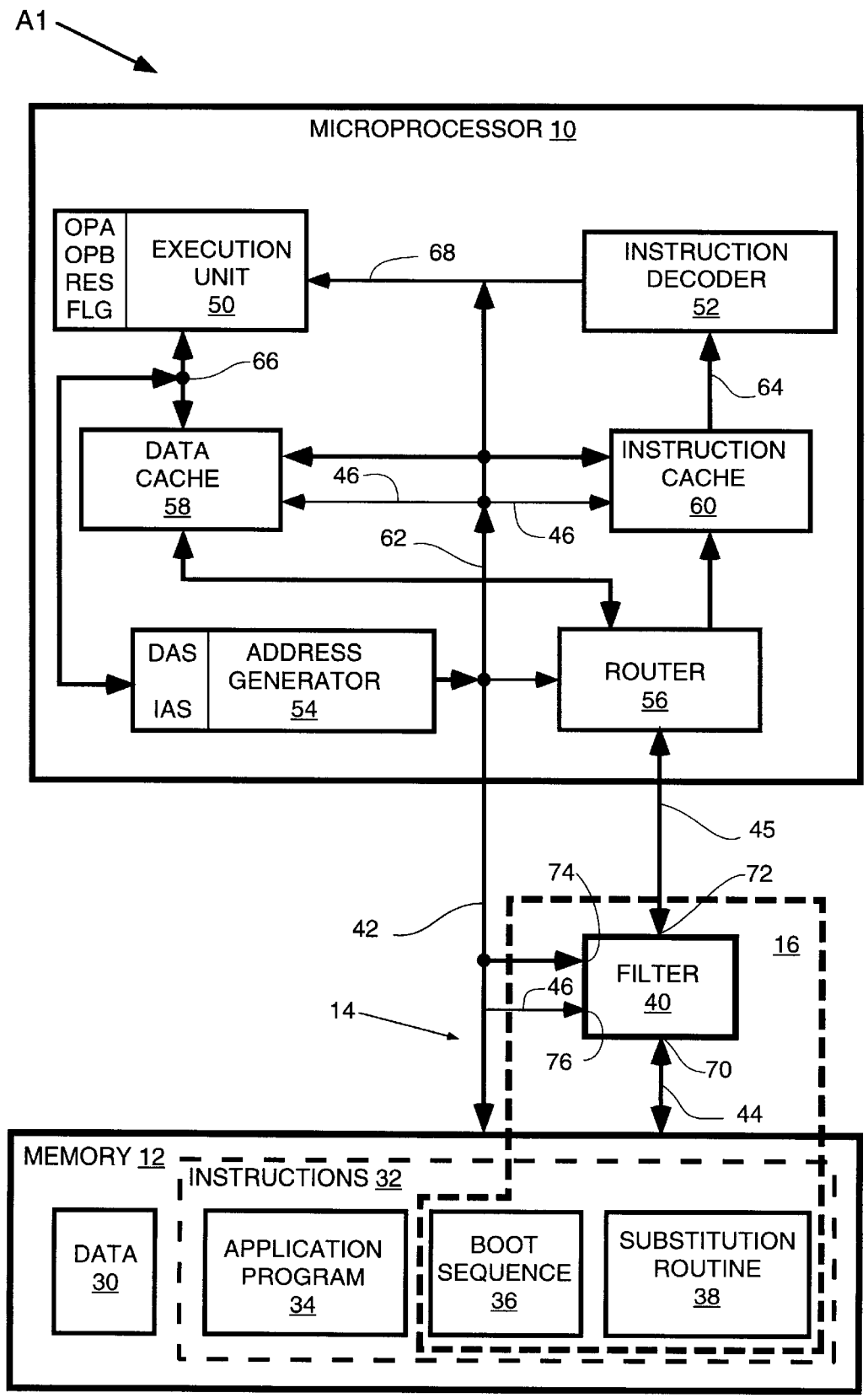
FIG. 1 is a schematic diagram of dual-cache data processing system with an instruction filter in accordance with the present invention.

In accordance with the present invention, a data processing system A1 comprises a microprocessor 10, a memory 12, a bus subsystem 14, and an instruction deimplementation subsystem 16. Memory 12 is a combination of hard disk memory and random access memory (RAM). Memory 12 stores data 30 and instructions 32. Instructions 32 constitute an application program 34, a boot sequence 36, and a substitution routine 38. Deimplementation subsystem 16 includes an instruction substitution filter 40 as well as boot sequence 36 and substitution routine 38.

Bus subsystem 14 includes an address bus 42 and a content buses 44 and 45 for data and instructions. Address bus 42 includes not only lines for address information, but related control lines, including "data-versus-instruction" lines 46 indicating whether an address is for data or for an instruction. Content bus 44 conveys data between memory 12 and filter 40, and conveys instructions from memory 12 to filter 40. Content bus 45 conveys data between microprocessor 10 and filter 40, and conveys instructions from filter 40 to microprocessor 10.

Microprocessor 10 includes an execution unit 50, an instruction decoder 52, an address generator 54, a content router 56, an internal data cache 58, and an internal instruction cache 60. Execution unit 50 has several internal registers including operand registers OPA and OPB, a result register RES, and a flag register FLG, while address generator 54 includes a data address stack DAS and an instruction address stack IAS. Within microprocessor 10, information flows along internal address bus 62, internal instruction bus 64, internal data bus 66, and decoded instruction lines 68.

Filter 40 has content ports 70 and 72, an address input 74, and an enable input 76. Content port 70 is coupled to memory 12 via content bus 44, while content port 72 is coupled to microprocessor via content bus 45. Address input 74 is coupled to address bus 42, while enable input 76 is coupled to "data-versus-instruction" control line 46 of address bus 42. Content port 70 serves as an instruction input, while content port 72 serves as an instruction output. Content port 72 also cooperates with address input 74 to provide for configuration data input (as well as read out).

Figure 2:
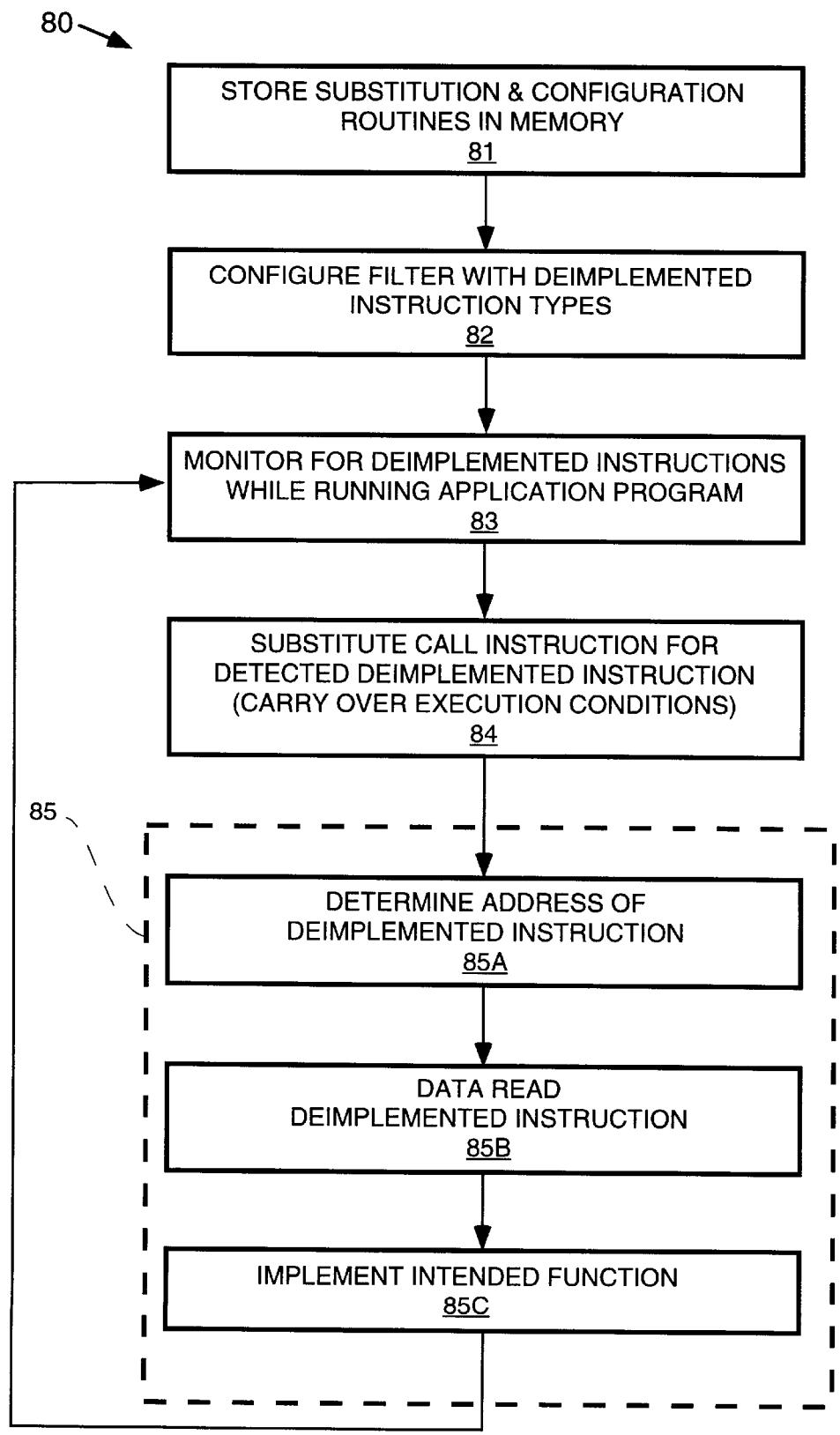
FIG. 2 is a flow chart of a method of the invention practiced in the context of the system of FIG. 1.

A method 80 practiced with data processing system A1 is flow charted in FIG. 2. Preparatory steps including installing the configuration software and the substitution routine at step 81. In system A1, the configuration software can be installed as a patch to the boot sequence, while the substitution routine is added to the system software. Upon system startup, the boot sequence is run, configuring the instruction substitution filter at step 82. When an application program is run, the instruction stream is monitored continuously at step 83.

Upon detection of an instruction of a deimplemented instruction type, filter 40 substitutes a call instruction at step 84. If the deimplemented instruction includes indications for it conditional execution, these are carried over to the call instruction. The call instruction causes the substitution routine to be run at step 85. At substep 85A, the substitution routine determines the address of the deimplemented instruction by accessing the instruction address stack IAS of address generator 54. The substitution routine can thus address the original deimplemented instruction using a data read instruction at substep 85B. Then the intended function of the deimplemented instruction can be effected precisely by the substitution routine at substep 85C. Once the substitution routine is complete, the application program can be resumed with a return to step 83.

The setup, function, and operation of system A1 is described in greater detail with reference again in FIG. 1. Microprocessor 10 is designed to execute a particular instruction set; the instructions of this set are referred to herein as "implemented instructions". The instruction format provides for additional "unimplemented" instructions that are reserved for use by a "more advanced" processor that implements a superset of the implemented instruction set for microprocessor 10. Instruction decoder 52 is designed to recognize unimplemented instructions and issue an exception when one is detected. An exception handler routine then "handles" the unimplemented instruction, e.g., by issuing an error indication. The "deimplemented" instructions referred to herein do not belong to the set of unimplemented instructions, but to the set of implemented instructions.

Upon system startup, boot sequence 36 is run. Boot sequence 36 causes configuration data to be stored in filter 40. Filter 40 includes internal memory in memory-mapped I/O space. Boot sequence 36 issues instructions for microprocessor 10 to write the configuration data to this space. This data identifies "deimplemented" instruction types and associated "substitute" instruction types. Filter 40 provides for sixteen deimplemented instruction types.

All instructions for microprocessor 10 are thirty-two bits long. For each instruction stored in filter 40, 4×32+1=129 bits are provided. A "instruction-type" sequence of thirty-two bits is for the instruction. A "match" sequence of thirty-two bits is provided to indicate which bits of the instruction-type sequence are relevant for matching purposes, with the remaining bits considered as wild cards. A "substitute" sequence of thirty-two bits represents the instruction to be substituted when a suitable match is detected. A "carryover" sequence of thirty-two bits is used to indicate which bits of the deimplemented instruction are to be carried over to the substitute instruction. The additional configuration bit indicates whether or not the filtering is activated or not for the corresponding instruction type.

An example of the use of wildcards concerns the carryover of execution conditions. The instruction format for microprocessor 10 reserves the most significant four bits as conditions for execution. For example, a "1" at the most significant bit position indicates that the instruction is to be executed only when a flag bit of register FLG indicates a zero result. A defectively implemented floating point divide instruction can be entered as configuration data in filter 40 with the first four bits indicated as wildcards. The substitute instruction can be a call instruction that addresses substitution routine 38. The carryover bits can indicate that the first four bits of the deimplemented instruction can be carried over to the substitute instruction. In this case, the substitution routine is only called when the conditions of execution for the deimplemented instruction are met. The substitution routine is not called when the deimplemented instruction (if not filtered) would not have been executed.

Once boot sequence 36 is completed, a user initiate application program 34. As application program 34 is running, address generator 54 issues memory addresses along address bus 42, along with an indication along lines 46 as to whether data or an instruction is being requested. Filter 40 is coupled to "data-versus-instruction" line 46 for the purpose of determining whether throughgoing contents are to be treated as data or instructions. Data passes through unfiltered, while instructions are examined for matches with the configuration data. Non-deimplemented instructions are not converted, while a substitution is made for deimplemented instructions.

When an instruction matches with a deimplemented instruction type, the indicated substitution is made. The match takes wildcard bits into account, while the substitution takes carryover bits into account. Preferably, a call instruction is substituted for a deimplemented instruction. A call instruction is an instruction that causes address generator 54 to store the current address in instruction address stack IAS and then issue an address indicated by the call instruction (at which substitution routine 38 is located). However, filter 40 does not constrain the substitute instructions to be call instructions. In fact, the substitute instruction need not even be an implemented instruction. For example, the substitute instruction can be an unimplemented instruction so that an exception handler is called in response to a deimplemented instruction.

The instruction requested by microprocessor 10 is transmitted from memory 12 via filter 40 to router 56 of microprocessor 10. Router 56 is coupled to internal address bus 62 for determining whether the received contents are data or instructions. Router 56 then routes the contents to the appropriate internal cache: data to data cache 58 and instructions to instruction cache 60.

In general, data is written from execution unit 50 to memory 12 through data cache 58 (where the data is cached), through router 56, and (unchanged) through filter 40. During the boot sequence, microprocessor 10 writes configuration data to memory I/O mapped to filter 40. In addition, a specialized reconfiguration program can command microprocessor 10 to write to this memory mapped I/O space to reconfigure filter 40. During a substitution routine, this space can be addressed to activate and deactivate filtering modes for specific deimplemented instruction types. The configuration and mode data are not cached because the filter addresses are selected from non-cacheable memory input-output space.

Whether immediately and/or at a time subsequent to the fetch, the substitute instruction is decoded by instruction decoder 52. Preferably, the substitute instruction is a call to the address at which substitution routine 38 is stored in memory 12. Depending on the instruction deimplemented and other factors, substitution routine 38 may or may not need to access the original deimplemented instruction. In some cases, for example, where only one instruction is deimplemented and no wildcards are specified, the substitution routine can determine the deimplemented instruction without ambiguity. In other cases, it may not be necessary to know the complete deimplemented instruction. In most cases, however, substitution routine 38 requires access to the deimplemented instruction directly.

If the substitute instruction is a call instruction, the address of the deimplemented instruction is stored in instruction address stack IAS of address generator 54. Substitution routine 38 issues a data read to this address to access the actual deimplemented instruction. Once the deimplemented instruction is fully determined, the substitution routine can effect the function the deimplemented instruction would have effected if it were not defectively implemented.

In some cases, the defective implementation of an instruction only affects a deimplemented instruction type under certain conditions. These conditions may be external to the instructions, e.g., dependent on values stored in execution unit registers RES, OPA, OPB, etc. Alternatively, the conditions can be internal to the instruction, e.g., dependent on certain bits in the specific instruction. If substitution routine 38 determines that the deimplemented instruction can be properly executed, it can reissue it. However, to avoid an unwanted substitution, substitution routine 38 can instruct microprocessor 10 to write "0" to the "active" configuration bit filter 40 to deactivate it. The deimplemented instruction can then be reissued. Substitution routine 38 can then reactivate filter 40, restore the proper state of microprocessor 10 and resume application program 34.

While system A1 is configured with a single substitution routine, it provides for a different substitution routine for each deimplemented instruction type entered into filter 40. The different substitution routines can be more precisely tailored for the specific deimplemented instruction type. The result is a potential performance improvement. In other embodiments, the substitute instruction or instructions are predetermined and thus unaffected by configuration.

Figure 3:
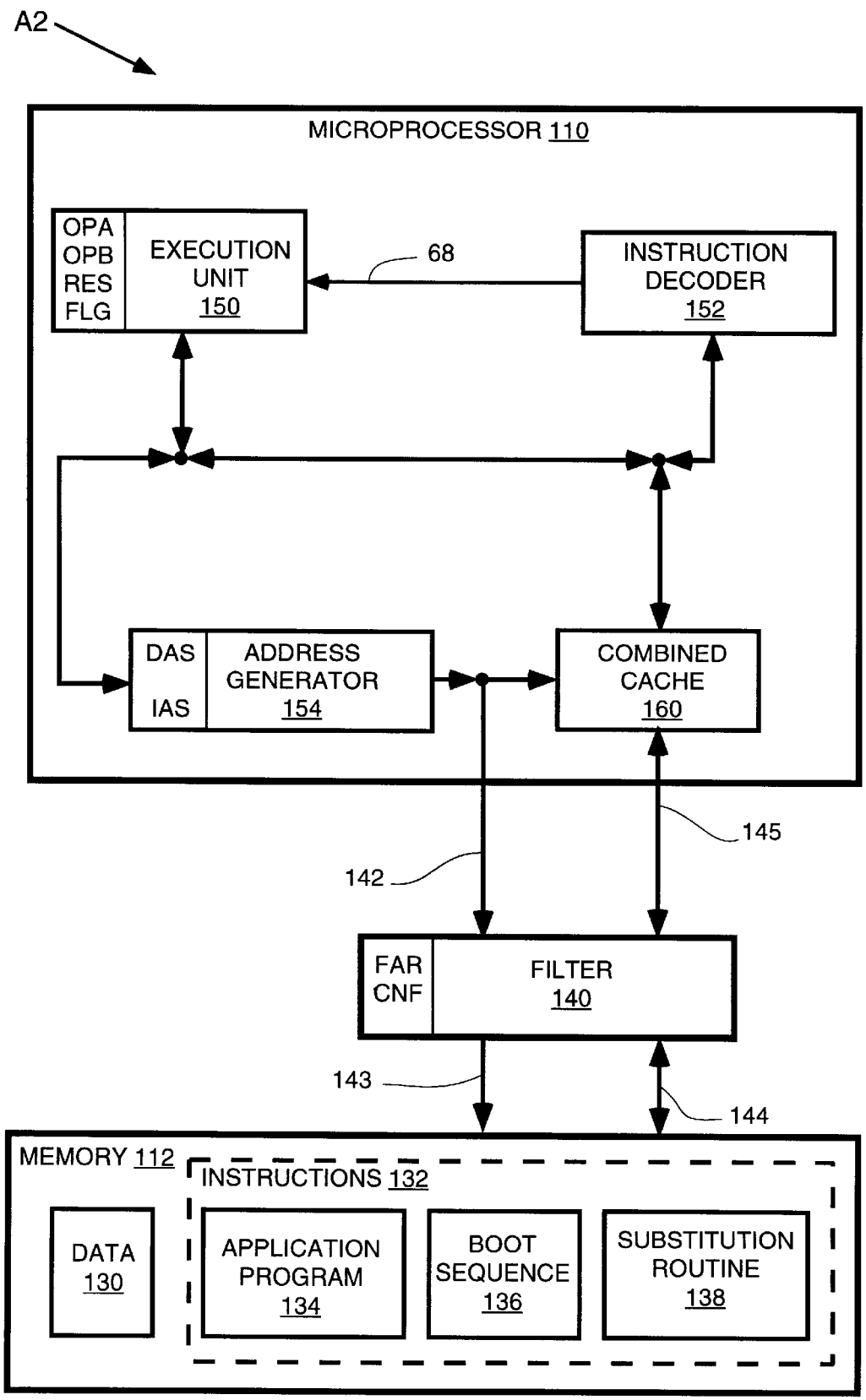
FIG. 3 is a schematic diagram of a combined-cache data processing system with an instruction/address filter in accordance with the present invention.

A second data processing system A2 comprises a microprocessor 110, memory 112, and a filter 140, as shown in FIG. 3. Microprocessor 110 includes an execution unit 150, an instruction decoder 152, an address generator 154, and a combined cache 160. Execution unit 150 includes several registers including operand registers OPA and OPB, a result register RES, and a flag register FLG. Address generator 154 includes a data address stack DAS and an instruction address stack IAS. Memory 112 stores data 130 and instructions 132. Instructions 132 include an application program 134, a boot sequence 136, and a substitution routine 138. Except as described below, the operation of system A2 is similar to system A1.

Filter 140 is arranged to filter addresses as well as instructions. Addresses are transmitted from microprocessor 110 to filter 140 via processor address bus 142; addresses are transmitted from filter 140 to memory 112 via memory address bus 143. Memory content bus 144 is used for conveying data between memory 112 and filter 140, and for conveying instructions from memory 112 to filter 140. Processor content bus 145 is used for conveying data between filter 140 and microprocessor 110, as well as for conveying instructions from filter 140 to microprocessor 110. Filter 140 includes configuration memory CNF and a filter address register FAR, both of which are in uncacheable memory I/O space. Configuration memory CNF is used to store the identities of deimplemented instructions. Address register FAR is used to store an address to be filtered.

When a deimplemented instruction is fetched from memory 112, filter 140 substitutes a call to substitution routine 138. When the call instruction is executed, address generator 154 stores in instruction address stack IAS the memory address of the deimplemented instruction. Substitution routine 138 transfers this address to address register FAR of filter 140.

Most addresses from address generator 154 are passed by filter 140 unchanged to memory 112. However, when it receives the address of register FAR during a read operation, filter 140 substitutes the contents of register FAR. Thus, when substitution routine 138 directs microprocessor 110 to read the data in register FAR, filter 140 does not place the contents of register FAR on processor content bus 145. Instead, filter 140 transmits the contents of register FAR along memory address bus 143 to memory 112. Since register FAR contains the address of the deimplemented instruction, this substitution has the effect of forcing memory 112 to place the deimplemented instruction as data on memory content bus 144. As data, the deimplemented instruction is passed unchanged to microprocessor 110 via processor content bus 145. The deimplemented instruction is thus fully specified to substitution routine 138, which can thus perform the function the deimplemented instruction was to perform. In comparison to filter 40, filter 140 adds the capability to filter the address bus to handle a combined cache.

Filter 140 can be used with most microprocessors that provide for non-cacheable memory space, including microprocessors with separate instruction and data caches, with a combined cache, and without a cache. Many microprocessors provide non-cacheable memory mapped input-output address space to handle communications peripherals (which should not be cached since their "contents" are continuously changing). At least the register used for instruction filtering should be in this uncacheable address space.

The present invention can be used for many purposes, but the primary one is to address the discovery of a defectively implemented instruction in cases where it is not possible or practical to swap the processor for another processor without the defect. Preferably, the invention is implemented on a system level by a savvy system manufacturer to protect its customers against future discovery of a defective instruction implementation. A system manufacturer apprised of a defect but committed to using the defective processor can incorporate the present invention to protect its customer's expectations. The invention can also be installed on a retrofit basis when the defect is discovered in previously manufactured systems.

The relation of function to silicon can be varied. In the illustrated systems, one integrated circuit includes microprocessor 10 along with its internal caches. Filter 40 is on a separate integrated circuit. The RAM portion of memory 12 can be on several integrated circuits. However, the filter can be integrated with a microprocessor, an external cache, or other external device.

Other approaches for avoiding a cached read of the substitute instruction include using an uncacheable read instruction where such an instruction is available. In some cases, a sequence of instruction can implement an uncacheable read. Where an instruction set allows invalidation of all or part of a cache, such an instruction can be used to prevent a cache hit of the substitute instruction. Where there is no single instruction nor any sequence of instructions that can invalidate or empty a cache, the subroutine can swamp the cache with data to ensure that the substitute instruction is cleared from the cache before attempting to read the deimplemented instruction.

Another approach is for the filter to include a cache mirror that duplicates the microprocessor cache except that the deimplemented instructions are stored instead of the substitute instructions. The cache mirror is located in a separate address space that could be addressed by the substitute routine using a predetermined offset from the address stored by the substitute call instruction. As these alternatives indicate, the instruction set of the microprocessor affects the options for addressing deimplemented instructions.

The present invention can be applied to cacheless systems, systems with external caches, and systems with both combined and separate data and instruction caches. The filter can be downstream of one or more caches (i.e., between a cache and the instruction decoder). In this case, the present invention considers that cache to be part of the memory subsystem instead of the processor subsystem.

What the foregoing embodiments, variations and modifications share is the susceptibility to correction of logic design defects discovered after microprocessors have been in use. From the perspective of the system manufacturer, the problem is reduced to one of software distribution. From the perspective of the user, the problem is reduced to using received software to patch and update existing software. The defect is addressed with minimal impact on performance and compatibility. These above-described and other modifications to and variations upon the preferred embodiments are provided for by the present invention, the scope of which is limited only by the following claims.

What is claimed is:

1. An instruction deimplementation subsystem for deimplementing instructions in a system including processor means for processing data by executing implemented instructions, memory means for storing said data and said instructions, and bus means for conveying addresses, instructions, and data between said processor means and said memory means, said subsystem comprising:

instruction input means for receiving stored instructions from said memory means via said bus means;

instruction output means for transmitting filtered instructions to said processor means via said bus means;

configuration input means for receiving configuration data via said bus means from at least one of said processor means and said memory means, said configuration data indicating which of said implemented instructions are deimplemented instructions and which of said implemented instructions are non-deimplemented instructions; and instruction conversion means for generating said filtered instructions from said stored instructions as they are received at said instruction input means in accordance with said configuration data so that the filtered instruction corresponding to one of said non-deimplemented instructions is the same as that non-deimplemented instruction and so that the filtered instruction corresponding to one of said deimplemented instructions is a substitute instruction differing from that deimplemented instruction, said instruction conversion means being coupled to said instruction input means for receiving stored instructions therefrom, said instruction conversion means being coupled to said instruction output means for transmitting said filtered instructions therefrom, said instruction conversion means being coupled to said configuration input means for receiving said configuration data therefrom.

2. An instruction deimplementation subsystem as recited in claim 1 further comprising a configuration program of said instructions stored in said memory means for providing said configuration data to said instruction input means.

3. An instruction deimplementation subsystem as recited in claim 1 further comprising a substitution program of said instructions stored in said memory means so as to be activated by said substitute instruction.

4. An instruction deimplementation subsystem as recited in claim 3 wherein said substitution program determines the address of said deimplemented instruction from the return address the respective filtered instruction and accesses said deimplemented instruction from said memory means using a data read instruction.

5. An instruction deimplementation subsystem as recited in claim 1 wherein said deimplemented instruction indicates conditions for its own execution, said instruction conversion means generating said filtered instruction so that it indicates the same conditions for its own execution.

6. An instruction deimplementation subsystem as recited in claim 1 further comprising:

address input means for receiving addresses from said processor means;

address output means for receiving addresses from said processor means;

address output means for transmitting addresses to said memory means;

address memory means for storing a deimplemented instruction address; and address conversion means for transmitting said deimplemented instruction address from said address output means in response to a reception at said address input means of a predetermined reserved address.

7. A method of deimplementing a subject instruction implemented on a data processor, said method comprising the steps of:

entering configuration data into an instruction filter so as to configure it to substitute a call instruction for said subject instruction, and storing a substitution routine at a memory address addressed by said call instruction;

monitoring for deimplemented instructions, while running a subject program including said subject instruction to be deimplemented;

substituting said call instruction for said subject instruction when said subject instruction is received by said instruction filter;

running said substitution routine;

resuming said subject program and said monitoring.

8. A method as recited in claim 7 wherein said step of running said substitution routine involves determining the address of said subject instruction from the return address of said call instruction, said substitution routine further involving accessing said subject instruction using a data read instruction.

9. A method as recited in claim 8 wherein said step of running said substitution routine further involves:

transferring said address of said subject instruction to said instruction filter; and issuing to said filter a data read instruction of a reserved address in uncacheable memory space so that said filter transmits said address of said call instruction to a memory storing said subject instruction so that said memory transfers said subject instruction to said filter, said filtering passing said subject instruction to said processor means unchanged.

10. A method as recited in claim 7 wherein said subject instruction indicates conditions for its execution, said substituting step involving generating said call instruction so that it indicates the same conditions for execution.

* * * * *